April 12, 1966

A. KOLMAN 3,245,107

CARCASS GRIPPING APPARATUS

Filed Nov. 5, 1963

INVENTOR.
ANDY KOLMAN
BY
Kenyon & Kenyon
ATTORNEYS

April 12, 1966

A. KOLMAN 3,245,107

CARCASS GRIPPING APPARATUS

Filed Nov. 5, 1963

INVENTOR.
ANDY KOLMAN
BY Kenyon & Kenyon
ATTORNEYS

April 12, 1966 — A. KOLMAN — 3,245,107
CARCASS GRIPPING APPARATUS
Filed Nov. 5, 1963 — 3 Sheets-Sheet 3

INVENTOR.
ANDY KOLMAN
BY Kenyon & Kenyon
ATTORNEYS

United States Patent Office 3,245,107
Patented Apr. 12, 1966

3,245,107
CARCASS GRIPPING APPARATUS
Andy Kolman, Indianapolis, Ind., assignor to Hygrade Food Products Corporation, Detroit, Mich., a corporation of New York
Filed Nov. 5, 1963, Ser. No. 321,466
19 Claims. (Cl. 17—44)

This invention relates to an apparatus for stabilizing or immobilizing cattle carcasses during the skinning thereof and more particularly to self-sterilizing automatic means for holding a cattle carcass to aid in the upward stripping of the hide from the back thereof.

Devices are already known for the effective automatic stripping of the hide from the underside of cattle. However, such devices are unsatisfactory for the final stripping of the side from the back of the carcass. It is the practice in such circumstances, after stripping the hide from the underside and while the carcass is still suspended from an overhead rail, to manually clear the hide around the nape or neck of the animal, and then attach the loosened hide at the neck to a winch-operated chain which pulls the remaining hide upward and strips the beef clean. This method of removing the hide from the back is satisfactory in some respects, but the stripping operation is made difficult because of the tendency of the suspended carcass to swing or oscillate. This swinging action creates a situation in which the carcass might free itself entirely from the overhead rail thus causing a serious safety hazard to personnel, damage to the beef itself and consequent sanitation problems. Furthermore, even if the carcass remains on the rail, the stripping action is not smooth and efficient and oftentimes results in the undesirable removal of the fat on the back of the carcass, which causes a loss in yield and a blotchy appearance. Also the hide being removed from the swinging carcass tends to whiplash and leave clumps of unsanitary dirt on the carcass itself.

It is also recognized that production is maximized when all steps in the processing of beef are accomplished while the carcass is continually moving on the overhead rail. This avoids costly and impractical line stoppages at any point. Consequently it is important that the step of hide stripping be accomplished while the carcass is continually moving laterally along the overhead guide rail.

Accordingly, it is an object of the present invention to provide a device to stabilize the carcass during the final hide stripping step and to do so without necessitating any delay or stoppage in the steady movement of the cattle on the guide rail.

It is further an object of this invention to provide a self-sterilizing power-operated device to automatically resist the movement of the carcass in response to the force of stripping the hide therefrom.

It is another object of this invention to provide a device of the character herewithin described which aids in stripping the hide from a carcass with a minimum loss of fat and avoids a sanitation problem.

Another object of this invention is to provide a device of the character described herewithin which firmly holds the suspended carcass at the lower extremities thereof during the hide stripping step and which prevents injury to the fat or meat of the beef.

Briefly stated, one embodiment of the present invention is a device for holding down a cattle carcass for permitting the upward stripping of the hide from the backside thereof while the carcass is suspended by its hind legs from an overhead rail comprising a supporting framework, a compressed air source, a cylinder and piston assembly extending horizontally from the framework and operatively connected at each end thereof to the compressed air source, valve means for permitting the compressed air to selectively enter either end of the cylinder so as to cause the piston to extend and retract in response thereto, carcass gripping means comprising a base member pinned to the free end of the piston and adapted to swivel in a horizontal plane, a pair of parallel U-shaped bars, each forming two curving arms, the U-shaped bars being spaced apart from each other and attached to the base member at a point approximately midway between the ends of the bars, the bars being arranged horizontally such that the arms thereof extend outwardly away from the piston, each U-shaped bar having a pointed prong attached thereto at a point midway between the ends of the arms thereof and adjacent to the base member, the prongs being oriented to extend outwardly in the same direction as the arms of the U-shaped bars, a pair of vertical bars interconnecting the respective ends of the arms of the opposing U-shaped bars, an enclosure extending from the framework adapted to house said gripping means when the piston is in the retracted position, a waterspray assembly within the enclosure connected by a conduit to a hot water source and adapted to impinge water on the gripping means enclosed therewithin, a valve in the line to said water source having a valve stem, cam means connected to the piston adapted to engage with and lower said valve stem when the piston is extended and to disengage with and raise said valve stem when the piston is retracted, and a waterspray nozzle external and adjacent to the enclosure connected to a water source and adapted to continually wash the outer surfaces of the housing. Thus, when the cattle carcass on the rail moves to a position opposite said device, the piston is extended to engage and align the carcass by means of the U-shaped bars and to further resist the upward movement of the carcass in response to the upward stripping of the hide by insertion of said prongs therein, and the piston is thereafter retracted into said housing where the entire gripping assembly is washed.

With the foregoing objects in view, and such other advantages and objects as will become apparent to those skilled in the art, the invention relates to the structural combination as hereinafter more particularly described with reference to the drawings, in which.

Figure 1:
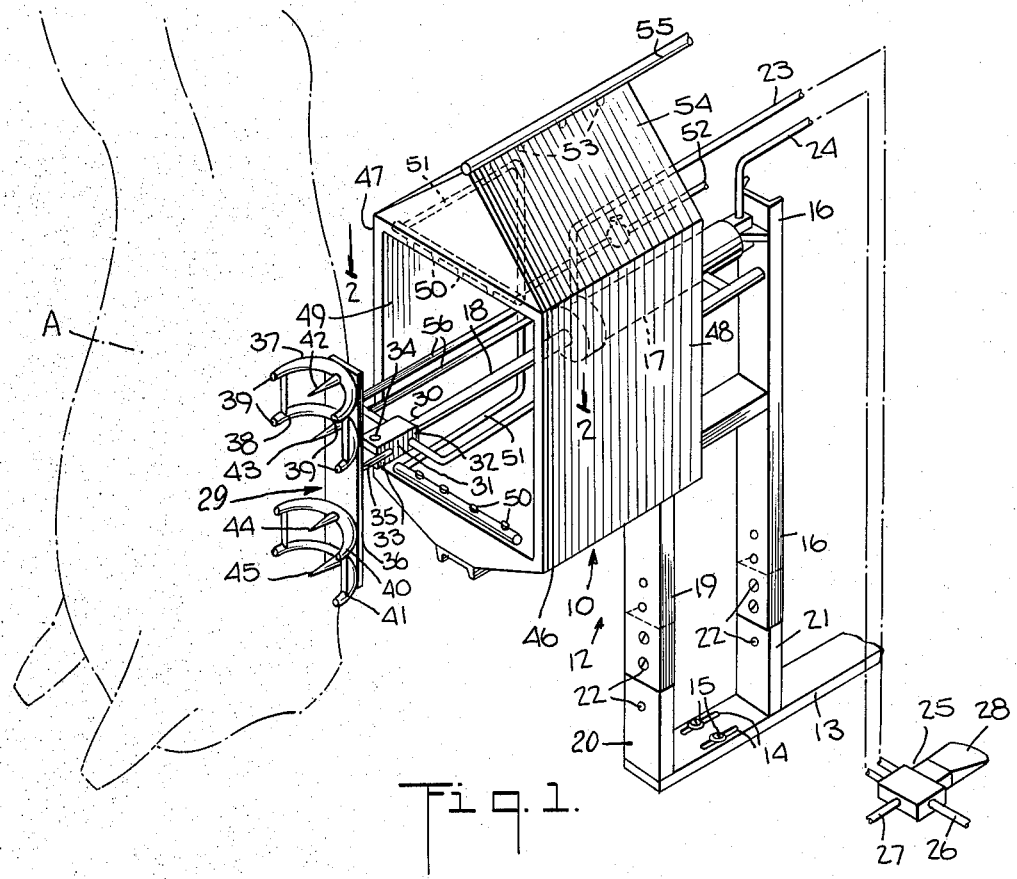
FIG. 1 is a perspective view of one embodiment of the invention.
Figure 5:
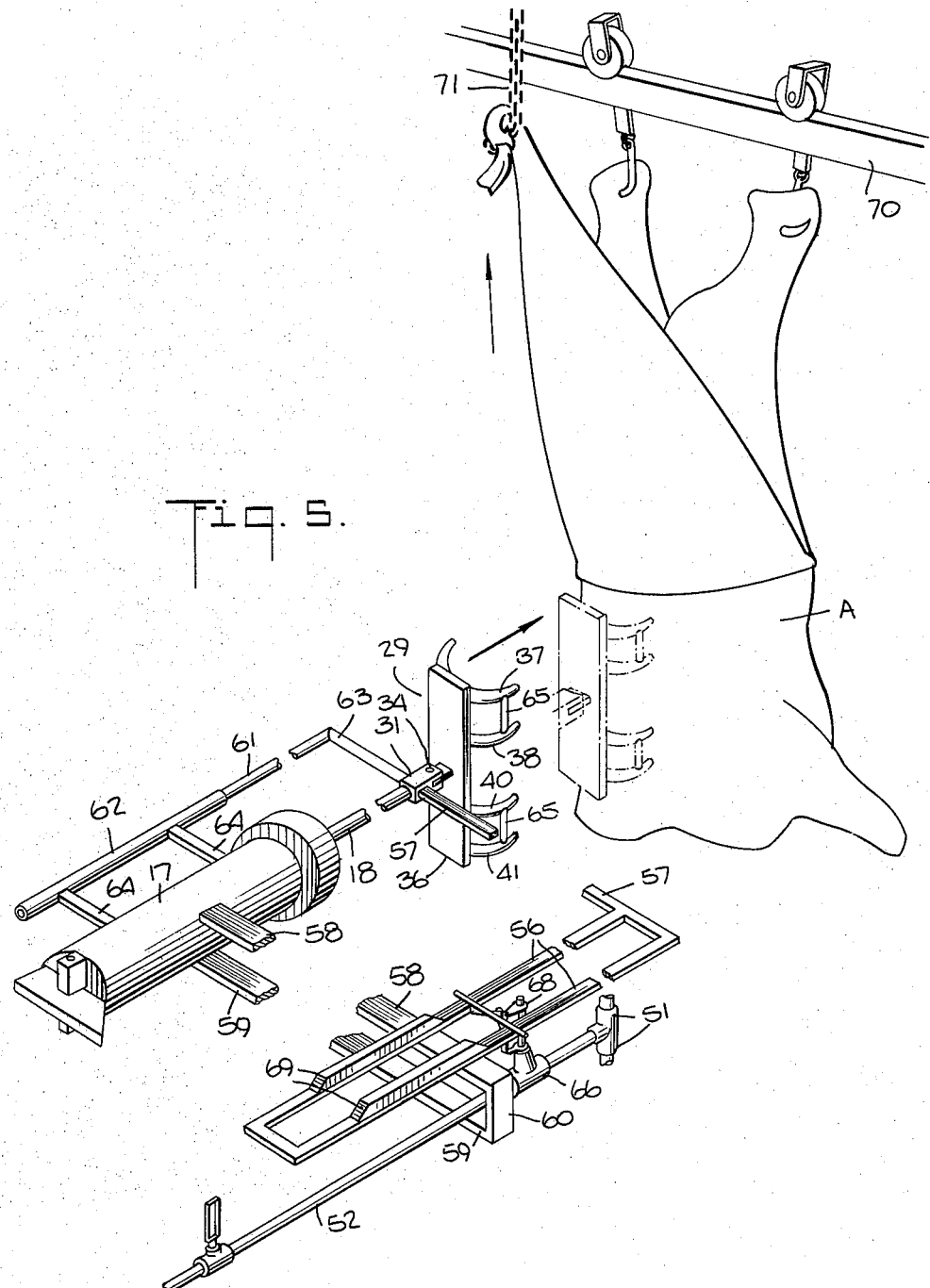
FIG. 5 is a partial perspective view of the embodiment of FIG. 1 showing the relative positions of the stabilizing assembly.

With reference particularly to FIG. 1, there is depicted a carcass stabilizing apparatus 10 in a form representative of the present invention. The apparatus embodies a rigid framework 12, which is preferably securely connected to the floor (not shown). Apparatus 10 is generally located adjacent the overhead rail 70, as shown in FIG. 5, from which moving carcasses such as carcass A shown in FIG. 1 are suspended. Apparatus 10 is positioned so that it is accessible to the unstripped back of the carcass A as the carcass A moves along overhead rail 70.

The relative position of apparatus 10 vis-a-vis carcass A is made adjustable by providing the lower strut 13 with a pair of slots 14 through which floor bolts 15 are inserted. The purpose served by this provision for adjustment will be described more fully hereinafter.

Attached to the frame 12 by frame member 16 is a horizontally oriented cylinder 17 containing piston 18. The height of cylinder 17 is made adjustable by bolting frame members 16 and 19 to the partially superimposed frame members 20 and 21 through any of a series of coaxially aligned holes 22.

The operation of piston 18 is responsive to a motive fluid, preferably compressed air, fed through lines 23 and 24.

A three-way foot-operated valve 25 is connected to lines 23 and 24 as shown. Also connected to valve 25 is supply line 26 and exhaust outlet 27. When foot pedal 28 of valve 25 is depressed by the operator, pressure is applied through line 24 and drives piston 18 out of cylinder 17. When foot pedal 28 of valve 25 is released, pressure is applied through line 23 instead of line 24 and as a result piston 18 is forced back into cylinder 17.

Assembly 29 is attached to the outer end 30 of piston 18.

Holding assembly 29 comprises a connecting member 31, one end 32 of which is rigidly attached to the piston end 30 and the other end 33 of which is connected by pin 34 to connecting bar 35. Bar 35 is rigidly attached to vertical support 36. Attached to support 36 are a pair of U-shaped bars 37, 38 the arms of which extend outwardly away from piston 18 and towards the carcass A. U-shaped bars 37 and 38 are similarly oriented and spaced slightly apart; their ends 39 are blunt. The curvature of bars 37 and 38 is such that it roughly approximates the curvature of the carcass A in the vicinity of the spine adjacent the chuck area. Bars 37 and 38 perform the primary holding function, as will be described more particularly hereinafter with reference to FIGS. 2 and 3.

Although only one pair of U-shaped bars 37 and 38 is necessary to the successful operation of the apparatus, an additional pair of U-shaped bars 40 and 41 are provided to impart flexibility with respect to the size of the carcasses which may be processed. Thus, the use of additional U-shaped bars, spaced one from the other on support 36 allows for the holding of a carcass in the optimum location regardless of the size of the particular carcass.

Each U-shaped bar 37, 38, 40 and 41, respectively, preferably has a pointed prong 42, 43, 44, 45 located between the arms and oriented in approximately the same direction as the arms. These prongs 42, 43, 44 and 45 aid the holding function of U-shaped bars 37, 38, 40 and 41 as will be described more particularly hereinafter.

An enclosure 46 having a pair of parallel sides 47, 48 and roof 54 is provided to house holding assembly 29 when piston 18 is in the retracted position. As shown, enclosure 46 protects the front end of the cylinder 17 and has an opening 49 through which piston 18 moves when driven out of cylinder 17.

Within enclosure 46, there are provided spray nozzles 50 which are connected to the conduits 51 which carry clean hot water under pressure. The pipe conduits 51 are connected to the main supply conduit 52. Nozzles 50 are intended to provide a spray pattern which impinges on all portions of assembly 29 within housing 46. Thus, assembly 29 is cleansed during the time that piston 18 is retracted within cylinder 17.

In addition, nozzles 53 are provided on the outside of the peak of roof 54 of enclosures 46 to continually wash away debris that collects on the external portions of enclosure 46 during the hide-stripping operation. Nozzles 53 are connected to conduit 55 which carries clean hot water under pressure.

Slidable supporting bars 56 are utilized to aid in supporting the weight of the holding assembly 29. As may be seen more clearly in FIG. 6, these supporting bars 56 are attached to cross-bar 57 which in turn is connected to member 31. Bars 56 ride along stationary support bar 58 which is firmly connected, for example by welding, to cylinder 17. Members 59 and 60 also aid in imparting rigidity to bar 58.

A second supporting structure comprising movable piston rod 61 which rides inside rigid tube 62 is employed.

As shown in FIG. 6, piston 61 is connected to member 63 which in turn is connected to connecting member 31. Tube 62 is rigidly attached to cylinder 17 by a pair of structure supports 64.

Figure 2:
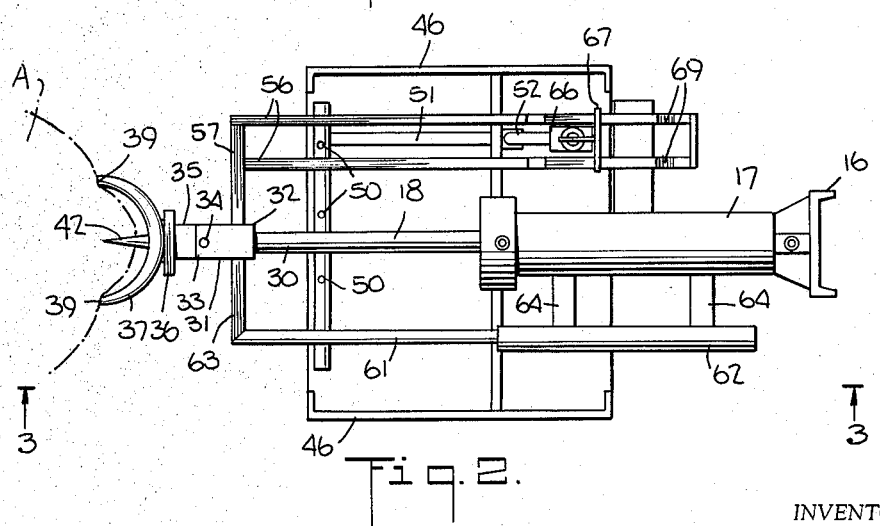
FIG. 2 is a plan view partly in section of the embodiment of FIG. 1 along line 2—2.
Figure 3:
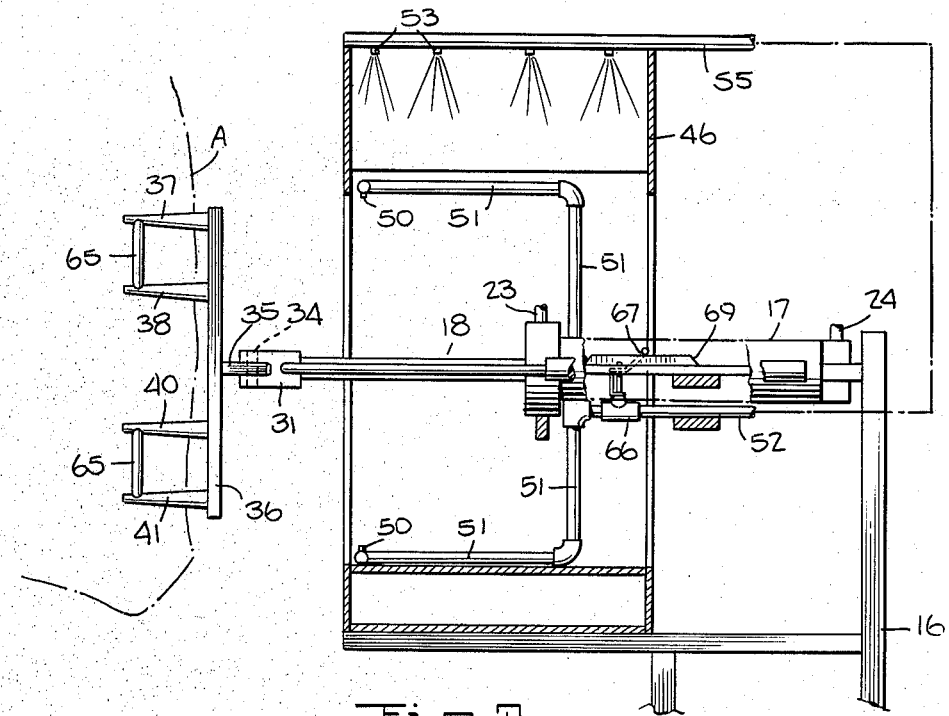
FIG. 3 is an elevational view partly in section of the embodiment of FIG. 2 taken along line 3—3 and showing the manner in which a carcass is stabilized.

Referring to FIG. 2 of the drawings, there is shown a plan view of assembly 29 with the piston 18 in the extended or "working" position. The U-shaped arms 37, etc. are in contact with the carcass A, and are embracing it about the spinal area. The ends 39 of the arms of the U-shaped bars 37, etc. pinch the carcass slightly and hold it in position, the blunt ends 39 preventing penetration of the meat. The pointed prongs 42, etc. situated between the ends of the arms, penetrate the carcass A slightly in the fatty section covering the area near the spine. The positions of all U-shaped bars 37, etc. are shown in FIG. 3. As shown in FIG. 3, the pairs of opposed U-shaped bars 37, 38, 40 and 41 are interconnected by vertical connecting bars 65. The latter provide additional contact area with the carcass and also resist any tendency of the arms of the U-shaped bars 37, etc. to puncture into the meat when the carcass A and U-shaped bars 37, etc. first come into contact. This restricts the action of the U-shaped bars 37, etc. to embracing the beef and, in effect, pinching it, without permanent damage to the carcass.

Figure 4:
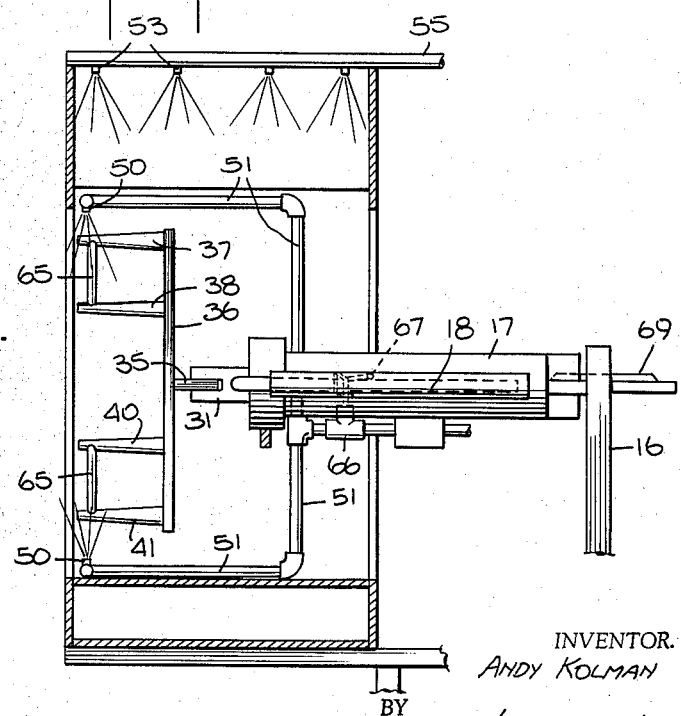
FIG. 4 is an elevational view partly in section similar to that of FIG. 3, but showing the manner in which the device is sterilized.

Since holding assembly 29 comes into direct contact with carcass A, and sometimes penetrates it, particularly if prongs 42, etc. are used, it is necessary to provide sanitizing facilities. These are conveniently incorporated into apparatus 10 by automatically sterilizing and washing the assembly 29 after each use. To this end means are provided in the water source conduit 52 feeding conduits 51 to provide control over the actuation of nozzles 50. Such means could conveniently be made responsive to the movement or position of piston 18. Thus, the nozzles 50 would provide a spray pattern of hot water to impinge on the assembly 29 when it is in the retracted position as shown in FIG. 4, and the hot water to nozzles 50 would be terminated when the assembly 29 is extended in the working position, as shown in FIG. 3.

FIG. 5 depicts one method for actuating the spray nozzles. A spring-loaded valve 66 is provided in the main conduit 52 feeding all of nozzles 50. Valve 66 is in the open position when valve stem lift bar 67 is resting on the supporting bars 56. However, the position of the valve stem 68 is depressed when the valve stem lift bar 67 is raised by cam members 69 in response to the forward movement of piston 18. Thus, cam members 69 are positioned on bars 56 so that they are behind the valve stem lift bar 67 of valve 66 when the piston 18 is in the retracted position. So long as the piston 18 is in the retracted position, a continuous stream of sterilizing water is forced through the nozzles 50 to wash and sterilize the retracted assembly 29. This condition is shown in FIG. 4. When the piston 18 is in the extended position, however, cam members 69 raise the valve stem lift bar 67, as shown in FIG. 3, and the valve 66 is closed.

The operation of the embodiment shown the drawings is as follows:

The partially stripped carcass A approaches the device on the overhead rail 70. Prior to arriving in the vicinity of apparatus 10, the skin attached to the neck of carcass A is cleared manually by a sharp instrument. The loosened neck-hide is then attached to an overhead chain 71 which is operatively connected over an overhead pulley (not shown) to an electrically operated winch (not shown). The operator actuates the winch and the chain pulls the hide off the back of the carcass A to just past chuck area (see FIG. 5). At this point, the moving carcass A is practically opposite apparatus 10.

The hide winch operator actuates three-way valve 25, thrusting the piston forward so that U-shaped bars 39, etc. forcefully contact carcass A and embrace it about the spinal area (see FIGS. 2 and 5).

The height of the area of contact may be adjusted by moving frame members 16 and 19 up or down with respect to frame members 20 and 21. The impact of the U-shaped bars 39, etc. against the carcass A as preferably of sufficient force to move or tilt the carcass A at a slight angle with respect to its normal suspended position. The weight of carcass A thus helps U-shaped bars 39, etc. to embrace it, pinch it, and thereby stabilize it. At the same time, prongs 42, etc. penetrate slightly into the fatty area near the spine. The force of the impact may be regulated by moving the frame 12 closer to or further away from carcass A through adjusting the bolts 15 in slots 14.

The hide-winch operator then activates the winch and pulls the remainder of the hide upward off carcass A. The tendency of carcass A to raise or swing during this operation is prevented by the grip of U-shaped bars 37, etc. If the hide is particularly resistant to removal, any strong tendency on the part of the carcass to swing upward is counteracted by a deeper penetration of the prongs 42, etc.

During this entire operation, carcass A is held firmly in alignment for the removal of the hide. The lateral movement of carcass A is compensated for by the ability of assembly 29 to pivot or swivel around pin 34.

As soon as the hide has been pulled free, the hide-winch operator releases the foot pedal 28 three-way valve 25 thus causing piston 18 and holding assembly 29 to retract into enclosure 46. When piston 18 retracts, cams 69 are disengaged from valve stem bar 67, permitting the valve 66 to open. The spray pattern from nozzles 50 then washes and sterilizes the retracted holding assembly 29. (See FIG. 4.) Assembly 29 is now ready for the next cycle.

While thus having described the invention with reference to the accompanying drawings, it is understood that modification or alterations could be made by those skilled in the art without departing from the spirit and scope of the invention, and that the drawings and descriptions herein are given by way of illustration only and are not considered as limiting the true scope of the invention.

And while the invention has been described particularly with regard to cattle carcasses by way of illustration, it will be readily apparent that the same basic principles are easily applicable to carcasses of other animals as well, and no limitation is to be implied by the particular type of carcass employed.

I claim:

1. An apparatus for stabilizing a carcass during the upward stripping of the hide from the back thereof while the carcass is suspended by its hind legs, comprising first means reciprocally movable in a substantially horizontal direction between an extended position and a retracted position, control means connected to said first means for placing said first means in one of said two positions, and carcass gripping means connected to said first means and reciprocally movable therewith for clutching said carcass in the vicinity of the spinal area when brought into firm engagement therewith by the movement of said first means into said extended position and for stabilizing said carcass against vertical movement.

2. An apparatus for stabilizing a carcass during the upward stripping of the hide from the back thereof while the carcass is suspended by its hind legs, comprising first means reciprocally movable in a subtsantially horizontal direction between an extended position and a retracted position, control means connected to said first means for placing said first means in one of said two positions, carcass gripping means connected to said first means and reciprocally movable therewith for clutching said carcass in the vicinity of the spinal area when brought into firm engagement therewith by movement of said first means into said extended position and for stabilizing said carcass against vertical movement, enclosure means for housing said carcass gripping means when said first means is in said retracted position, and means located within said enclosure for cleansing said carcass gripping means when said carcass gripping means is within said enclosure.

3. An apparatus for stabilizing a carcass during the upward stripping of the hide from the back thereof while the carcass is suspended by its hind legs from an overhead rail, comprising first means reciprocally movable in a substantially horizontal direction between an extended position and a retracted position, control means connected to said first means for placing said first means in either one of said two positions, and carcass gripping means pivotally connected to said first means and reciprocally movable therewith for clutching said carcass in the vicinity of the spinal area when brought into firm engagement therewith by movement of said first means into said extended position and for stabilizing said carcass against vertical movement, said pivotal connection permitting said carcass gripping means to move in a horizontal plane, said carcass gripping means being adapted to seize said carcass in the vicinity of the spinal area when brought into firm engagement therewith by the movement of said first means into said extended position.

4. An apparatus for stabilizing a carcass during the upward stripping of the hide from the back thereof while the carcass is suspended by its hind legs from an overhead rail, comprising first means reciprocally movable in a substantially horizontal direction between an extended position and a retracted position, control means connected to said first means for placing said first means in one of said two positions, carcass gripping means pivotally connected to said first means and reciprocally movable therewith for clutching said carcass in the vicinity of the spinal area when brought into firm engagement therewith by movement of said first means into said extended position and for stabilizing said carcass against vertical movement, said pivotal connection permitting said carcass gripping means to move in a horizontal plane, enclosure means for housing said carcass gripping means when said first means is in said retracted position, and means located within said enclosure for cleansing said carcass gripping means when said carcass gripping means is within said enclosure.

5. An apparatus for stabilizing a carcass during the upward stripping of the hide from the back thereof while the carcass is suspended by its hind legs from an overhead rail, comprising first means reciprocally movable in a substantially horizontal direction between an extended position and a retracted position, control means connected to said first means for placing said first means in one of said two positions, carcass gripping means comprising a vertical base member pivotally connected to said first means and reciprocally movable therewith, a pair of parallel U-shaped bars spaced apart from each other, said U-shaped bars being connected to said base member so that the ends thereof extend outwardly away from said first means in a horizontal plane, a pair of pointed prongs associated with said pair of U-shaped bars, said prongs being attached to said base member and positioned so that they extend outwardly in substantially the same horizontal plane as the ends of said U-shaped bars, said pivotal connection permitting said carcass gripping means to move in a horizontal plane, enclosure means for housing said carcass gripping means when said first means is in said retracted position, and means located within said enclosure for cleansing said carcass gripping means when said carcass gripping means is within enclosure.

6. An apparatus for stabilizing a carcass during the upward stripping of the hide from the back thereof while the carcass is suspended by its hind legs from an overhead rail, comprising a horizontally positioned cylinder and piston assembly operatively connected to a power source, said piston being reciprocally movable in a substantially horizontal direction between an extended position and a retracted position, control means connected to said cylinder and piston assembly and to said power source, said control means being adapted to place said piston in one of said two positions, carcass gripping means pivotally connected to said piston and reciprocally movable therewith for clutching said carcass in the vicinity of the spinal area when brought into firm engagement therewith by movement of said first means into said extended position and for stabilizing said carcass against vertical movement, said pivotal connection permitting said carcass gripping means to move in a horizontal plane, enclosure means for housing said carcass gripping means when said piston is in said retracted position, and means located within said enclosure for cleansing said carcass gripping means when said carcass gripping means is within said enclosure.

7. The apparatus according to claim 6 wherein said power source is compressed air and wherein said control means is a foot-actuated three-way valve having a first conduit connected to said power source, a second conduit connected to one end of said cylinder and piston assembly, and a third conduit connected to the other end of said cylinder and piston assembly.

8. An apparatus for stabilizing a carcass during the upward stripping of the hide from the back thereof while the carcass is suspended by its hind legs from an overhead rail, comprising first means reciprocally movable in a substantially horizontal direction between an extended position and a retracted position, control means connected to said first means for placing said first means in one of said two positions, carcass gripping means pivotally connected to said first means and reciprocally movable therewith for clutching said carcass in the vicinity of the spinal area when brought into firm engagement therewith by movement of said first means into said extended position and for stabilizing said carcass against vertical movement, said pivotal connection permitting said carcass gripping means to move in a horizontal plane, enclosure means for housing said carcass gripping means when said first means is in said retracted position, and means for cleansing said carcass gripping means when said carcass gripping means is within said enclosure comprising watersprays within said enclosure, said waterspray being connected by a conduit to a water source and adapted to impinge a spray of water on said gripping assembly, and means for controlling the flow of water to said watersprays, said flow control means being responsive to the position of said first means.

9. An apparatus for stabilizing a carcass during the upward stripping of the hide from the back thereof while the carcass is suspended by its hind legs from an overhead rail, comprising first means reciprocally movable in a substantially horizontal direction between an extended position and a retracted position, control means connected to said first means for placing said first means in one of said two positions, carcass gripping means comprising a vertical base member pivotally connected to said first means and reciprocally movable therewith, a pair of parallel U-shaped bars spaced apart from each other, said U-shaped bars being connected to said base member so that the ends thereof extend outwardly away from said first means in a horizontal plane, said pivotal connection permitting said carcass gripping means to move in a horizontal plane, enclosure means for housing said carcass gripping means when said first means is in said retracted position, and means located within said enclosure for cleansing said carcass gripping means when said carcass gripping means is within said enclosure.

10. The apparatus according to claim 5 which includes, in addition, at least one additional U-shaped bar and associated pointed prong spaced apart from said pair of parallel U-shaped bars and positioned on said base member in the same manner as set forth for said pair of U-shaped bars.

11. An apparatus for stabilizing a carcass during the upward stripping of the hide from the back thereof while the carcass is suspended by its hind legs from an overhead rail, comprising a frame, a horizontally positioned cylinder and piston assembly attached to said frame and operatively connected to a power source, said piston being reciprocally movable in a substantially horizontal direction between an extended position and a retracted position, control means connected to said cylinder and piston assembly and to said power source, said control means being adapted to place said piston in either one of said two positions, carcass gripping means comprising a vertical base member pivotally connected to said piston and reciprocally movable therewith, a pair of parallel U-shaped bars spaced apart from each other, said U-shaped bars being connected to said base member so that the ends thereof extend outwardly away from said first means in a horizontal plane, a pair of pointed prongs associated with said pair of U-shaped bars, said prongs being attached to said baes member and positioned so that they extend outwardly in substantially the same horizontal plane as the ends of said U-shaped bars, said pivotal connection permitting said carcass gripping means to move in a horizontal plane, enclosure means for housing said carcass gripping means when said first means is in said retracted position, and means located within said enclosure for cleansing said carcass gripping means when said carcass gripping means is within said enclosure.

12. An apparatus for stabilizing a carcass during the upward stripping of the hide from the back thereof while the carcass is suspended by its hind legs from an overhead rail, comprising first means reciprocally movable in a substantially horizontal direction between an extended position and a retracted position, control means connected to said first means for placing said first means in one of said two positions, carcass gripping means comprising a vertical base member pivotally connected to said first means and reciprocally movable therewith, a pair of parallel U-shaped bars spaced apart from each other, said U-shaped bars being connected to said base member so that the ends thereof extend outwardly away from said first means in a horizontal plane, a pair of pointed prongs associated with said pair of U-shaped bars, said prongs being attached to said base member and positioned so that they extend outwardly in substantially the same horizontal plane as the ends of said U-shaped bars, said pivotal connection permitting said carcass gripping means to move in a horizontal plane, enclosure means for housing said carcass gripping means when said first means is in said retracted position, and means for cleansing said carcass gripping means when said carcass gripping means is within said enclosure comprising watersprays within said enclosure, said watersprays being connected by a conduit to a water source and adapted to impinge a spray of water on said gripping means, and means for controlling the flow of water to said watersprays, said flow control means being responsive to the position of said first means.

13. The apparatus according to claim 12 wherein said flow control means comprises a cam means connected to said first means and adapted to move reciprocally therewith, and a control valve in said conduit, said cam means being adapted to activate said control valve in response to the movement of said first means between said extended position and said retracted position.

14. The apparatus according to claim 5 wherein said gripping means includes a pair of parallel vertical bars interconnecting the vertically opposed ends of said pair of spaced U-shaped bars.

15. An apparatus for stabilizing a carcass during the upward stripping of the hide from the back thereof while the carcass is suspended by its hind legs from an overhead rail, comprising a frame, a horizontally positioned cylinder and piston assembly attached to said frame and operatively connected to a power source, said piston being reciprocally movable in a substantially horizontal direction between an extended position and a retracted position, control means connected to said cylinder and piston assembly for placing said piston in one of said two positions, comprising a foot-actuated three-way valve having a first conduit connected to said power source, a second conduit connected to one end of said cylinder and piston assembly, and a third conduit connected to the other end of said cylinder and piston assembly, carcass gripping means comprising a base member pinned to the free end of said piston and adapted to swivel in a horizontal plane, a pair of parallel U-shaped bars connected to said base member, each forming two curving arms, said U-shaped bars being spaced one from another in a vertical direction and attached to said base member at a point approximately midway between the ends of said bars, the arms of said U-shaped bars extending outwardly away from said piston in a horizontal direction, a pointed prong attached to each U-shaped bar at a point midway between the ends of the arms thereof and adjacent to said base member, said prongs being oriented to extend outwardly in the same direction and in approximately the same plane as the arms of said U-shaped bars, and a pair of vertical bars interconnecting the respective ends of the arms of the opposing U-shaped bars, enclosure means extending from said framework and housing said carcass gripping means when said piston is in the retracted position, a waterspray assembly located within said enclosure means and adapted to impinge a spray of water on said carcass gripping means when said piston is in said retracted position, means for providing hot water to said water spray assembly comprising a conduit connected to a hot water source, a control valve in said conduit and cam means connected to said piston and adapted to actuate said control valve in response to the movement of said piston between said extended position and said retracted position, and a nozzle external and adjacent to said enclosure connected by a conduit to a water source, said nozzle being adapted to continually impinge water on the outer surfaces of said enclosure, whereby when the cattle carcass on said rail moves to a position opposite said device, the piston extends said gripping means to engage and align the carcass by means of said U-shaped bars and to further resist the upward movement of said carcass in response to the upward stripping of the hide by insertion of said prongs therein, and the piston is thereafter retracted into said enclosure where the gripping means is washed by said waterspray assembly.

16. The apparatus according to claim 15 in which the frame assembly is both horizontally and vertically adjustable, whereby the position of the cylinder and piston assembly may be moved relative to the position of the carcass.

17. The method of removing the hide from the backside of a cattle carcass which is suspended by its hind legs from a guide rail comprising freeing a portion of the hide from the carcass at the neck by means of a sharp instrument, attaching said freed portion to a chain which is operatively connected to an overhead pulley and winch system, pulling the hide vertically upward by means of said chain to the extent that at least the chuck area of said carcass is stripped of its hide, thereafter securing the carcass by means of contacting the stripped portion of the spine with a pair of piston-driven parallel vertically aligned U-shaped bars so that the opposing arms of each of said U-shaped bars embrace and pinch the carcass between them on each side of the spinal area, and thereafter stripping the remainder of the hide upwardly off the secured carcass by means of said chain and winch.

18. The method according to claim 17, wherein said carcass is further secured by inserting sterilized pointed prongs into the spinal area thereof, said prongs being attached to said U-shaped bars about midway between the opposing arms thereof.

19. An apparatus for stabilizing a carcass during the upward stripping of the hide from the back thereof while the carcass is suspended by its hind legs from an overhead rail, comprising a frame, a horizontally positioned cylinder and piston assembly attached to said frame and operatively connected to a power source, said piston being reciprocally movable in a substantially horizontal direction between an extended position and a retracted position, control means connected to said cylinder and piston assembly for placing said piston in one of said two positions comprising a foot-actuated three-way valve having a first conduit connected to said power source, a second conduit connected to one end of said cylinder and piston assembly, and a third conduit connected to the other end of said cylinder and piston assembly, carcass gripping means comprising a vertical base member pivotally connected to said piston, a pair of parallel U-shaped bars spaced apart from each other, said U-shaped bars being connected to said base member so that the ends thereof extend outwardly away from said piston in a horizontal plane, a pair of pointed prongs associated with said pair of U-shaped bars, said prongs being attached to said base member and positioned so that they extend outwardly in substantially the same horizontal plane as the ends of said U-shaped bars, said pivotal connection permitting said carcass gripping means to move in a horizontal plane, enclosure means for housing said carcass gripping means when said first means is in said retracted position, and means located within said enclosure for cleansing said carcass gripping means when said carcass gripping means is within said enclosure.

References Cited by the Examiner

UNITED STATES PATENTS

| | | | |
|---|---|---|---|
| 1,603,562 | 10/1926 | Taylor | 17—44 |
| 1,962,799 | 6/1934 | Whitmarsh | 17—44 |
| 2,544,437 | 3/1951 | Stow | 17—45 |
| 2,640,225 | 6/1953 | Force et al. | 17—45 |
| 2,696,633 | 12/1954 | Hincks | 17—21 |
| 2,885,726 | 5/1959 | Reser et al. | 17—21 |
| 2,897,537 | 8/1959 | Schmidt | 17—21 |
| 2,994,910 | 8/1961 | Liebmann | 17—21 |
| 3,121,910 | 2/1964 | Wells et al. | 17—23 |

SAMUEL KOREN, *Primary Examiner.*

LUCIE H. LAUDENSLAGER, *Examiner.*

H. P. DEELEY, *Assistant Examiner.*